United States Patent [19]

Sauder

[11] Patent Number: 4,902,164
[45] Date of Patent: Feb. 20, 1990

[54] MITERED JOINT ASSEMBLY
[75] Inventor: Myrl D. Sauder, Archbold, Ohio
[73] Assignee: Sauder Woodworking Co., Archbold, Ohio
[21] Appl. No.: 212,436
[22] Filed: Jun. 28, 1988

Related U.S. Application Data

[63] Continuation-in-part of Ser. No. 937,742, Dec. 4, 1986.
[51] Int. Cl.$^4$ ............................................. B25G 3/36
[52] U.S. Cl. ................................ 403/402; 403/401; 403/294
[58] Field of Search ...................... 403/401, 402, 294

[56] References Cited

U.S. PATENT DOCUMENTS

| 3,204,905 | 9/1965 | Marban | 248/188 |
| 4,032,242 | 6/1977 | Morris | 403/231 |

FOREIGN PATENT DOCUMENTS

| 2559046 | 8/1985 | France | 403/402 |
| 403463 | 12/1933 | United Kingdom | 403/402 |
| 1358863 | 7/1974 | United Kingdom | 403/401 |

Primary Examiner—Andrew V. Kundrat
Attorney, Agent, or Firm—Emch, Schaffer, Schaub & Porcello Co.

[57] ABSTRACT

A mitered joint assembly having first and second furniture components joined by a bracket is disclosed. The components define interior surfaces. The interior surfaces have longitudinally extending pilot grooves. The pilot grooves engage one another. A bracket having legs is mounted adjacent the interior surfaces of the furniture components. The legs of the bracket each include at least one opening for receiving fasteners which extend through the openings. The fasteners are received in the grooves which act as pilot holes and as alignment means. The bracket has an inner surface and an outer surface. The inner surface includes tongue means consisting of projections which are received in the pilot grooves for aligning the components.

3 Claims, 2 Drawing Sheets

MITERED JOINT ASSEMBLY

The present application is a continuation-in-part of patent application, Ser. No. 937,742, filed on Dec. 4, 1986.

BACKGROUND OF THE INVENTION

The present invention is directed to a mitered joint assembly which is adaptable to furniture in general and specifically to ready-to assembly furniture. More specifically, the invention is directed to a mitered joint assembly which has first and second furniture components joined together by a bracket.

Brackets for holding together furniture components are known in the art. For example, one known bracket is metal having perpendicular legs, each of which defines an opening. Fasteners, such as screws, are used to connect the bracket to the furniture components to join the furniture components together. This type of prior art bracket can be bent if a force is placed on one of the furniture components. This leaves a joint which is either misaligned or includes an unsightly gap.

Furthermore, the screw holes in ready-to-assembly furniture components must be defined. Often holes are drilled by the manufacturer at prearranged locations along the edge of the individual furniture components. This results in considerable labor, and the need for relatively careful positioning of the holes. If the holes are drilled incorrectly, the consumer of the furniture has difficulty in assembling the furniture components because of the misalignment of the individual holes.

The primary object of the present invention is to provide a mitered joint assembly in which alignment grooves are defined by the furniture components. The alignment grooves are used as pilot holes for the fasteners, such as screws, during assembly.

An important object of the present invention is to provide a mitered joint assembly having a bracket which has sufficient strength to hold the assembly together.

Another object of the present invention is to provide a mitered joint assembly having a bracket which has tongue means consisting of projections which can be positioned in the alignment grooves to ensure a correct alignment of the components.

SUMMARY OF THE PRESENT INVENTION

The present invention relates to a joint assembly which has first and second furniture components. The components define interior surfaces. The interior surfaces have longitudinally extending pilot grooves. The pilot grooves meet one another.

A bracket having legs is mounted adjacent the interior surfaces of the furniture components. The legs of the bracket each include at least one opening for receiving fasteners which extend through the openings. The fasteners are received in the grooves which act as pilot holes and as alignment means.

The bracket has an inner surface and an outer surface. The inner surface includes tongue means consisting of projections which are received in the pilot grooves for aligning the components.

DETAILED DESCRIPTION OF THE PREFERRED EMBODIMENT

Figure 1:
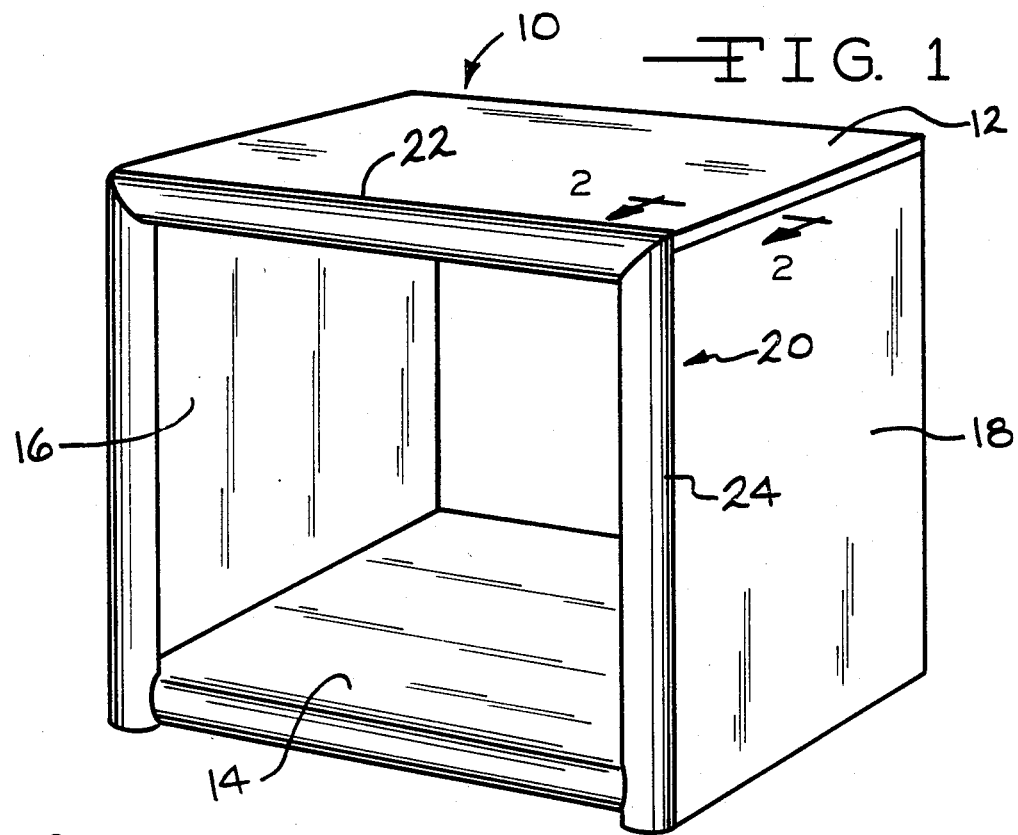
FIG. 1 is a perspective view of a ready-to-assembly end table which includes two furniture components joined together.

A ready-to-assembly end table 10 is shown in FIG. 1. The end table 10 includes a top 12, a bottom 14, a first side 16 and a second side 18. The joint assembly constructed in accordance with the present invention is indicated generally by the reference numeral 20.

Figure 2:
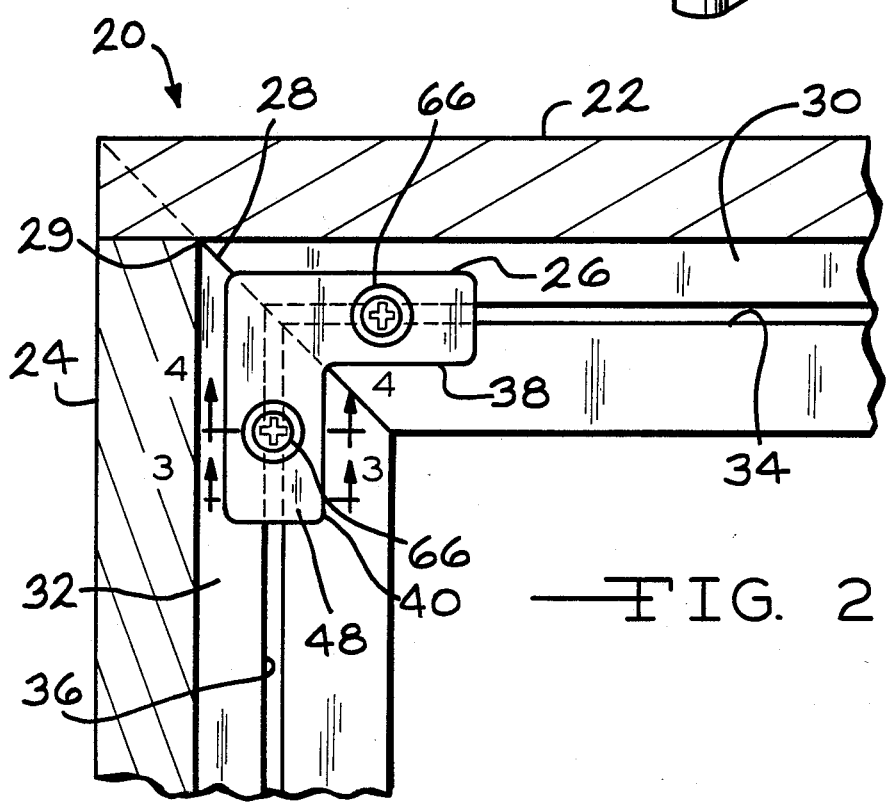
FIG. 2 is a fragmentary, enlarged view taken along the line 2—2 of FIG. 1 showing two furniture components held together by a bracket.

Referring to FIGS. 1 and 2, the joint assembly consists generally of a first component 22, a second component 24 and a bracket 26. In the present embodiment, the first and second components 22 and 24 are positioned at 90° angles to one another. Mating edges 28 and 29 of the components 22 and 24 each define equal angles of 45°. However, it should be understood that the edges 28 and 29 of the components 22 and 24, respectively, could be beveled at an infinite number of equal angles to form a mitered joint.

The first component 22 defines a first interior surface 30. The second component 24 defines a second interior surface 32. The first interior surface 30 has a first longitudinally extending pilot groove 34. The second interior surface 32 has a second longitudinally extending pilot groove 36. In the present embodiment, the first and second pilot grooves 34 and 36 engage one another at a right angle along edges 28 and 29. However, the first and second pilot grooves 34 and 36 can engage one another at an infinite number of angles along edges 28 and 29.

Figure 6:
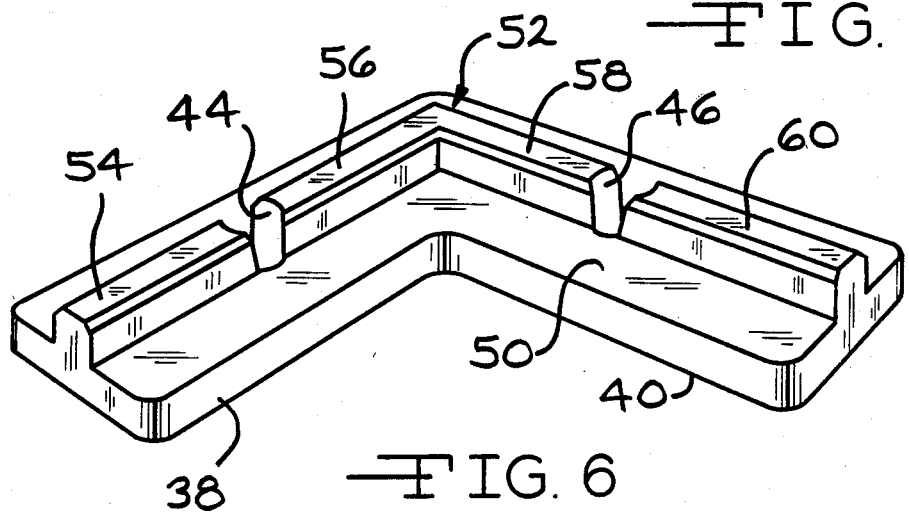
FIG. 6 is a perspective view of the bracket showing the inner surface and tongue means of the bracket.

Still referring to FIG. 2, the bracket 26 is formed as an integral member. The bracket 26 is preferably constructed of a plastic material. It has been found that an injection molded nylon bracket provides a sturdy component for a joint assembly according to the present invention. The bracket 26 includes a first leg 38 and a second leg 40. In the present embodiment, the legs 38 and 40 are perpendicular to one another. However, the legs 38 and 40 could be positioned in an infinite number of angles with respect to one another in order to accommodate the angular relationship of the first and second components 22 and 24. The legs 38 and 40 each define at least one opening for receiving fasteners. As shown in FIG. 6, a first opening 44 is defined by the first leg 38, and a second opening 46 is defined by the second leg 40.

Referring to FIGS. 2 and 6, the bracket 26 includes an outer surface 48 and an inner surface 50. The bracket 26 defines outwardly extending tongue means 52 extending along the inner surface 50. The tongue means 52 are inserted in the pilot grooves 34 and 36 in order to assure the proper alignment of the components 22 and 24, and also to join the components together. In the present embodiment, the tongue means consists of a plurality of projections including a first projection 54, a second projection 56, a third projection 58 and a fourth projection 60. The first and second projections 54 and 56 extend from opposite sides of the first opening 44 in the first leg 38. The third and fourth projections 58 and 60 extend from opposite sides of the second opening 46 in the second leg 40. In the present embodiment, the first and second projections 54 and 56 and the third and fourth projections 58 and 60 are positioned in a perpendicular relationship to one another to complement the perpendicular relationship of the pilot grooves 34 and 36. However, the first and second projections 54 and 56 and the third and fourth projections 58 and 60 could be positioned in an infinite number of angles with respect to one another in order to accommodate the angular relationship of the pilot grooves 34 and 36.

Figure 5:
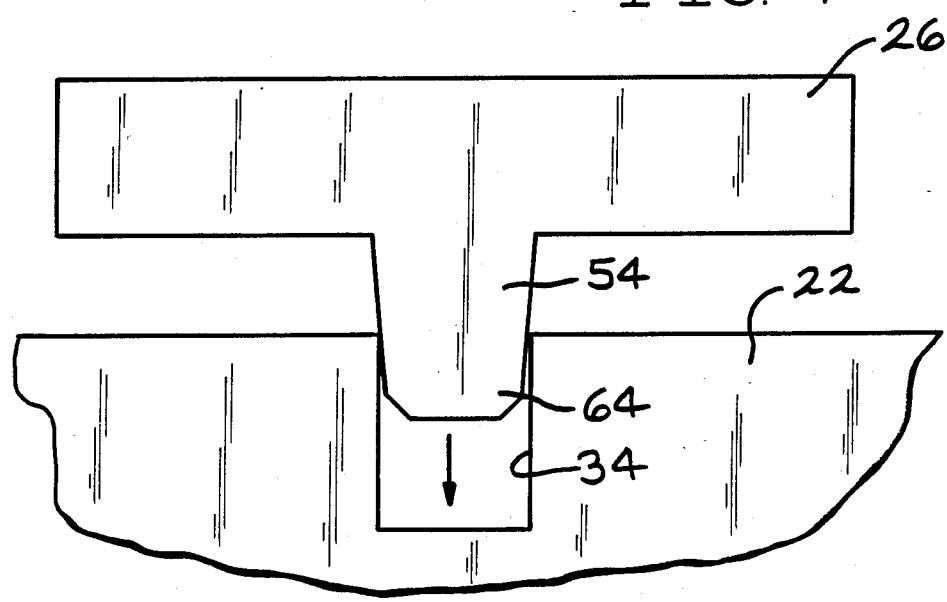
FIG. 5 is a fragmentary, side elevational view of the tongue means of the bracket being inserted into the longitudinally extending groove of a furniture component.

Referring to FIG. 5, each of the projections, for example first projection 54, is tapered at projection end 64. The tapering of projection end 64 allows for a secure fit between the first projection 54 and the pilot groove 34 when the bracket is mounted adjacent to the component 22.

Figure 3:
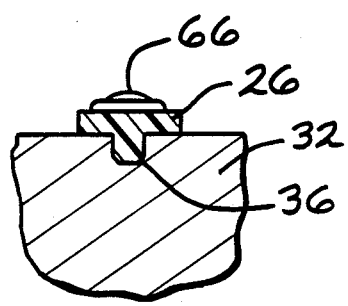
FIG. 3 is a sectional view taken along the line 3—3 of FIG. 2 showing the bracket positioned in the longitudinally extending groove of a furniture component.
Figure 4:
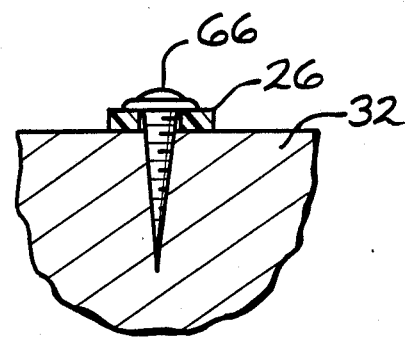
FIG. 4 is a sectional view taken along the line 4—4 of FIG. 2 showing the positioning of a fastener through the bracket into a furniture component.

Referring to FIGS. 2, 3 and 4, fasteners 66, such as screws or other suitable means, are received by the first and second openings 44 and 46. The fasteners 66 extend through the openings 44 and 46 into the longitudinally extending pilot grooves 34 and 36. The fasteners 66 hold the bracket 26 in place when the bracket has been mounted adjacent to the components 22 and 24.

It should be understood that many changes can be made to the structure in the drawings and still fall within the scope of the following claims.

What I claim is:

1. A mitered joint assembly for ready-to-assemble furniture having first and second components, said components each having edges, said components being angularly positioned to one another, said furniture components defining interior surfaces, which are not visible from a location exterior of the assembled furniture, said furniture components having longitudinally extending pilot grooves extending along said interior surfaces, said interior surfaces containing said pilot grooves lying in the same plane, said pilot grooves being aligned with one another at a mitered joint, a planar bracket having a first leg and a second leg, said legs being angularly positioned with respect to one another, said bracket having an outer surface and an inner surface, said planar bracket defining an outwardly extending tongue means along said inner surface, said inner surface of said planar bracket being mounted adjacent such interior surfaces of said furniture components, said tongue means being received in said pilot grooves for aligning such furniture components, at least one opening in each one of said first and second legs for receiving fasteners which extend through such openings into such longitudinally extending pilot grooves to hold said furniture components in such mitered joint, said tongue means comprising a plurality of tapered projections extending along said inner surface of said bracket.

2. A mitered joint assembly, according to claim 1, wherein said tongue means comprises a first projection, a second projection, a third projection and a fourth projection, said projections extending along said inner surface of said planar bracket, said first and second projections extending from opposite sides of said opening in said first leg, said third and fourth projections extending from opposite sides of said opening in said second leg, said first and second projections and said third and fourth projections being tapered and angularly positioned with respect to one another.

3. A mitered joint assembly, according to claim 1, wherein said bracket is constructed of a plastic material.

* * * * *